Patented Jan. 8, 1952

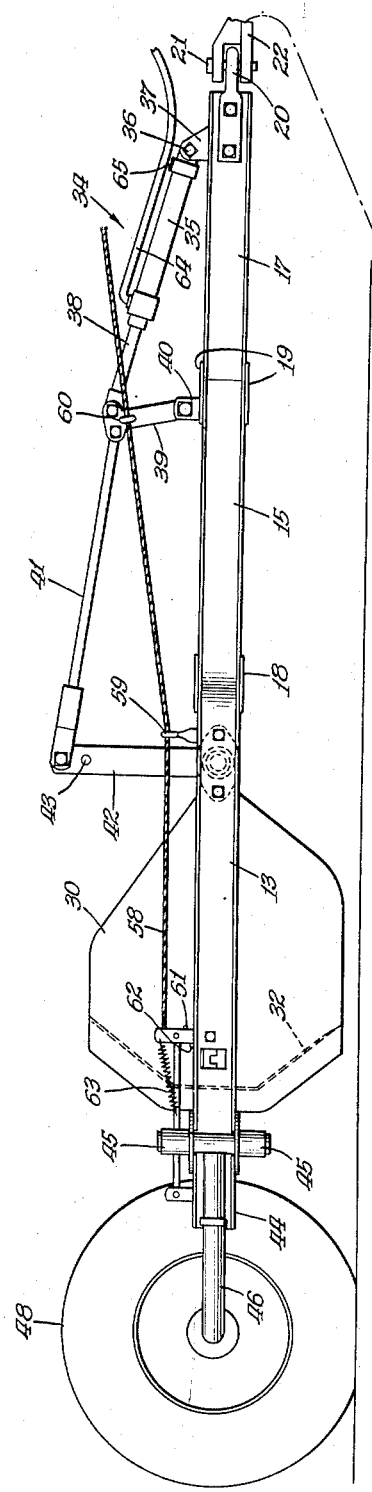

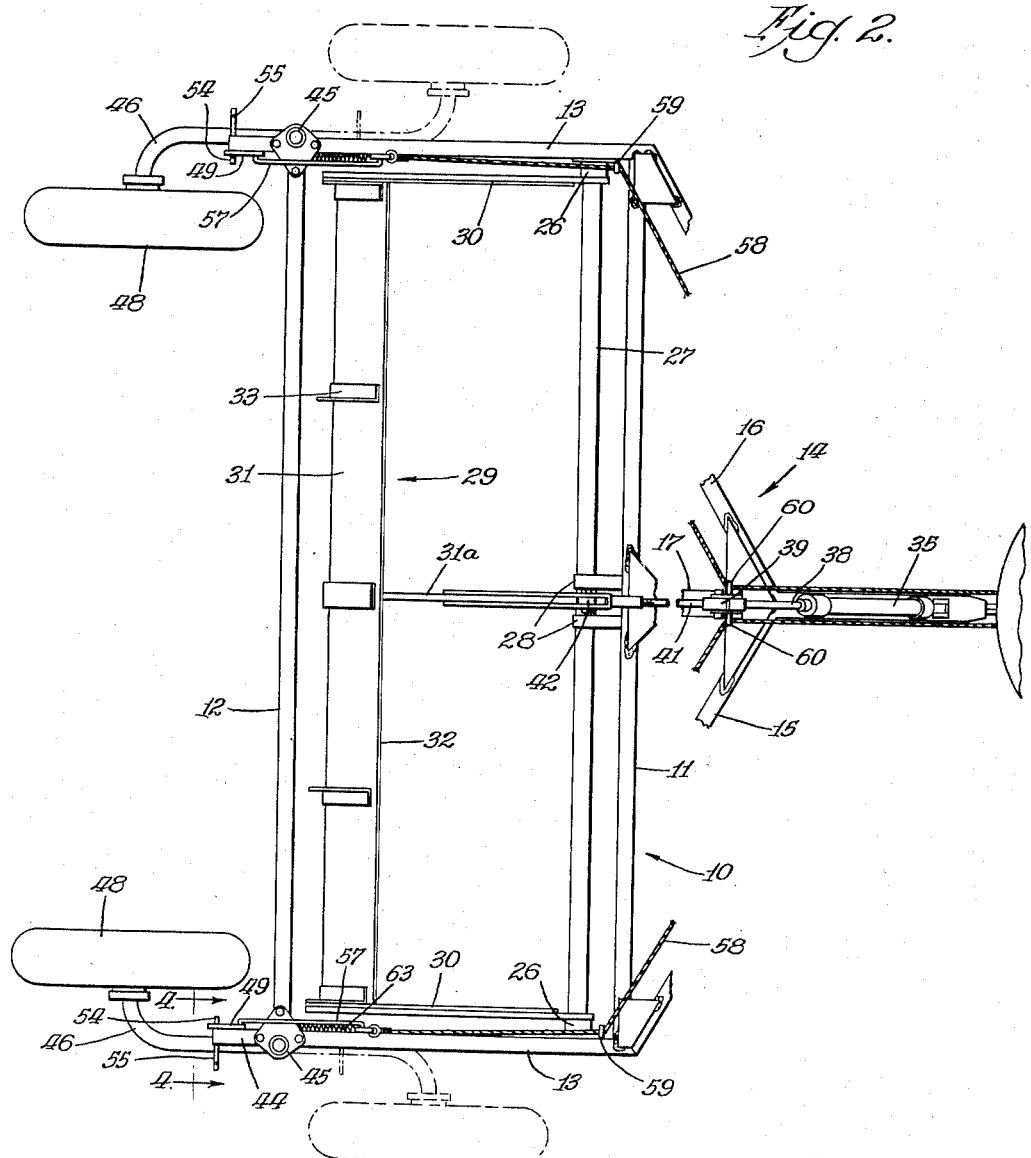

2,581,533

UNITED STATES PATENT OFFICE 2,581,533

AGRICULTURAL IMPLEMENT

James L. Hipple, Chicago, Ill., assignor to International Harvester Company, a corporation of New Jersey Application August 30, 1946, Serial No. 693,947

5 Claims. (Cl. 37—169)

This invention relates to earth-working implements, and particularly to a bordering and leveling implement adapted to be drawn by a tractor. Such an implement comprises a frame and a transverse scraping blade adapted to move and quickly dump earth to form borders for irrigation purposes, or to remove elevations and fill depressions.

The blade is so shaped that earth is accumulated and is deposited by raising and tilting the blade.

An object of the present invention is to provide an improved ground scraper construction adapted to be connected to a tractor and to derive power therefrom for its operation.

Another object of the invention is to provide in an implement of the ground scraper type, which is adapted to be used for leveling and irrigating purposes, supporting wheels movable from a position where they travel on ground which has been worked by the blade, to a position at the ends of the blade where they travel upon unworked ground.

Another object of the invention is to provide means for locking the wheels in either of their two positions, and means accessible to the operator of the tractor for controlling the action of the wheels, so that the position of the wheels can be changed without the tractor operator leaving his seat.

Other objects and advantages will become clear from the following detailed description when read in conjunction with the accompanying drawings, wherein:

Fig. 1 is a view in side elevation showing the rear end of a tractor with a bowl-type scraper embodying the features of the present invention attached thereto;

Fig. 2 is a plan view of the structure shown in Fig. 1;

Fig. 3 is a detail of the locking mechanism for the supporting wheels; and

Fig. 4 is a section taken on the line 4—4 of Figure 2.

Referring to the drawings, it will be noted that the implement of the present invention comprises a transversely extending rectangular frame indicated by the numeral 10 and including front and rear frame bars 11 and 12, respectively, and side bars 13.

Secured to the frame 10 and extending forwardly therefrom is a draft structure 14, triangularly shaped, comprising right- and left-hand bars 15 and 16, respectively, secured at their rear ends to the frame at the forward corners thereof. The bars 15 and 16 extend forwardly in converging relation and are secured at their forward ends to the sides of a draft member 17 which extends rearwardly and forwardly and is secured at its rear end to the front frame bar 11. Additional bracing is provided on the front frame bar 11 by plates 18 secured to member 17 and at the juncture of the bars 15 and 16 by plates 19.

The forwardly extending end of the draft member 17 is provided with a loop 20 for pivotal connection to a vertically extending pin 21 carried by the draft bar 22 of a tractor 23. Tractor 23 is provided with rear wheels 24 and an operator's station 25.

Near the forward ends of the side bars 13 and adjacent the front frame bar 11 are provided a pair of bearings 26 which serve to support the ends of a transversely extending rock-shaft 27 supported centrally by bearings 28 carried by front frame bar 11. Rock-shaft 27 functions as the support for bowl-type scraper 29 carried within the rectangular frame 10 and comprising side or end walls 30 secured at their forward ends to the rock-shaft 27, and a rear wall 31, generally arcuate in shape, and comprising a blade 32 having its lower edge sharpened for the purpose of penetrating the soil. An additional brace 31a is provided for connecting the rock-shaft to the central portion of the rear wall 31. The blade 32 is reinforced by bars 33 provided at spaced locations therealong. The rear wall 31 of the scraper bowl extends transversely of the machine and connects the rear ends of the side walls 30. At this point it should be clear that since the scraper bowl 29 is affixed by its end walls to the transverse rock-shaft 27, rocking of the shaft 27 will cause general vertical swinging of the bowl to and from a dumping or transport position.

Rocking of the shaft 27 to swing the bowl 29 is accomplished by a mechanism including a hydraulic cylinder and piston unit indicated at 34 and including a cylinder 35 pivoted at 36 upon lugs 37 secured to the draft member or tongue 17. Cylinder 35 is provided with a piston rod 38 which is pivotally connected to the upper end of a rock-arm 39 which in turn is pivoted upon a lug 40 secured to the upper plate 19. Rock-arm 39 is connected by an adjustable rod 41 to the upper end of an arm 42 mounted upon the rockshaft 27 centrally thereof. Arm 42 is provided at its upper end with a plurality of apertures 43 for connection of the rod 41 thereto to provide for more or less rapid swinging of the bowl 29 between operating and dumping positions.

Each of the side frame bars 13 is provided with a rearward extension 44 and a pair of bearings 45 are mounted thereupon adjacent the rear frame bar 12 to provide for the pivotal mounting upon a vertical axis of an axle 46 which extends parallel to the side frame bars 13 and is provided with a vertical axle portion 47 rotatably received in the bearings 45, so that the axle may be swung forwardly and rearwardly in an arc of approximately 180°. Each of the frame bars 13 is channel shaped, and when the axle 46 has been swung forwardly or rearwardly to an extreme position, it rests snugly against the vertical wall of the channel member. Each axle 46 is curved inwardly and has journaled upon the end thereof a supporting wheel 48.

It will now be observed that the wheel-supporting axle 46, being pivoted upon a vertical axis, may be swung to vary the position of the wheel 48 from one in which it is rearwardly of the frame and laterally inwardly of the ends of the scraper bowl, as viewed in solid lines in Fig. 2, to a position where the wheel is laterally outwardly of the rectangular frame 10 and in general transverse alinement with the scraper bowl 29. This latter position is indicated in dotted lines in Figure 2. The latter position of the wheel 48 is preferred when the implement is used for irrigating purposes, that is, when borders are being formed, so that the wheels will travel at the sides of the bowl and not in trailing relation thereto. When using the scraper for leveling purposes, it is preferable that the wheels assume the solid line position and travel to the rear of the scraper bowl.

In order to facilitate the change of the position of the wheel from the rear of the bowl to the side thereof, releasable latching mechanism is provided for each of the wheel units and control means is provided within easy reach of the operator of the tractor from his station thereon. This latching mechanism comprises a pair of bell-cranks 49 and 50, bell-crank 49 being pivoted at 51 upon the inner face of the side frame bar 13 at the rear end thereof and bell-crank 50 being pivoted at 52 upon the bar 13 on the opposite sides of the bearings 45 from the position of the bell-crank 49. Bell-crank 49 is provided with another arm 53 which extends rearwardly and functions as a latching member cooperating with a latching element 54 which is provided on one side of axle 46 and passes through an opening 54a provided in the side bar 13. The engagement of the latching element 54 with the bell-crank arm 53 prevents the outward swinging of the axle 46 carrying the wheel 48. A similar latching element 55 is provided on the side of the axle 46 opposite the latching element 54 and functions when the wheel has been swung to the dotted line position in Fig. 2 as a latching member passing through an opening 55a in side bar 13 and cooperating with an arm 56 of the bell-crank 50 to hold the axle and its wheel from swinging out of position. In either position of the wheel, the latching mechanism may be released by rocking the bell-cranks 49 and 50 in a clockwise direction as viewed in Figs. 1 and 3. These bell-cranks may be rocked simultaneously and for this purpose are connected by a link 57. The latches are released from their locking position with the wheel axle 46, to permit it to be moved to its other position, by means of a cable 58 connected to the upper end of the bell-crank 50. Cable 58 extends forwardly parallel to the side bar 13, and the cable on each side of the frame is passed through an eye 59 secured adjacent the forward end of the bar 13 and extends forwardly and laterally, the cables on opposite ends of the implement paralleling the draft frame bars 15 and 16. The forward ends of the cables are passed through eyes 60 provided at the upper end and on opposite sides of the rock-arm 39 and are connected to the operator's seat 25 of the tractor. Without moving from his seat on the tractor, the tractor operator is able to change the position of his wheels 48, at will, by manipulating the cables 58 to rock the bell-cranks 49 and 50 forwardly and release the latching elements 54 and 55 carried by the axle 46. The forward rocking of the bell-cranks is limited by a stop 61 secured to the forward edge of the bell-crank 50 and rearward rocking thereof is limited by a stop 62 secured to the rear edge of the crank, said stops being adapted to engage the upper edge of the side bar 13. The bell-cranks are biased to engaged position with the operating latch by means of a spring 63 connected at one end to the bell-crank 50 and at its other end to the link 57. Likewise when the wheel 48 is swung from one position to another, the flexibility of the spring 63 permits the bell-cranks to rock upon engagement of the latching element 54 or 55 therewith. When the wheel 48 is in the dotted line position shown in Figure 2, it may be readily changed to the solid line position therein shown by the operator grasping the cables 58 and releasing the latching mechanism to permit the axle and the wheel to swing outwardly and reversely. To bring the wheel 48 from the solid line to the dotted line position as shown in Figure 2, the operator needs only to release the latches and move forwardly a short distance to permit the wheels to swing outwardly, whereupon he may reverse his direction until the wheel have been locked in their dotted line position.

The operation of the bowl-type scraper with which the present invention is concerned should be clear from the foregoing description. Power for vertical swinging of the scraper bowl to transport position or to dump the dirt accumulated therein is provided by the hydraulic cylinder unit 34 which is a cylinder of the double-acting type. The cylinder is provided with fluid under pressure through conduits 64 and 65 from the tractor 23 and the operation thereof is under control of the tractor operator from his station 25.

Having described the invention, it should be understood that modifications may be made therein without departing from the spirit thereof or the scope of the appended claims.

I claim:

1. An earth working implement adapted to be drawn by a tractor or the like comprising a transverse frame, a tool carried by the frame, an arm pivoted on a vertical axis at each end of the frame and extending rearwardly therefrom, a wheel journaled on the end of said arm, said arm being swingable about its pivot to move said wheel from a position rearwardly of the frame to a position alongside the frame, latching mechanism carried by the frame at opposite sides of said pivot, latching means on the arm cooperable with each of the latching mechanisms on the frame to lock the wheel in either of its positions, and means accessible to the tractor operator for releasing said latching mechanism in either position of the wheel.

2. An earth working implement adapted to be drawn by a tractor or the like comprising a transverse frame, a tool carried by the frame, an arm pivoted on a vertical axis at each end of the frame and extending rearwardly therefrom, a wheel journaled on the end of said arm, said arm being swingable about its pivot to move said wheel from a position rearwardly of the frame to a position alongside the frame, latching mechanism carried by the frame at opposite sides of said pivot, latching means on the arm cooperable with each of the latching mechanisms on the frame to lock the wheel in either of its positions, a latch release lever for each latch means, release means for each latch means accessible to the tractor operator connected to one said latch release lever, and connecting means between said release levers for simultaneously releasing both said latch means.

3. An earth working implement adapted to be drawn by a tractor or the like comprising a transverse frame, a tool carried by the frame, an arm pivoted on a vertical axis at each end of the frame and extending rearwardly therefrom, a wheel journaled on the end of said arm, said arm being swingable about its pivot to move said wheel from a position rearwardly of the frame to a position alongside the frame, latching mechanism carried by the frame at opposite sides of said pivot, latching means on the arm cooperable with each of the latching mechanisms on the frame to lock the wheel in either of its positions, a latch release lever for each latch means, release means for each latch means accessible to the tractor operator connected to one said latch release lever, and connecting means between said release levers for simultaneously releasing both said latch means, and spring means biasing said latch means to latching position.

4. A tractor drawn bowl type ground scraper or the like, comprising a transversely extending rectangular frame having front, rear and side bars, a triangular draft structure extending forwardly from the frame for attachment to a tractor, a wheel-carrying axle pivotally connected to the rear portion of each said side bar for swinging movement about a vertical axis from a position with the wheel in the rear of the frame to a position with the wheel alongside the frame, latching means for holding said wheel axle in either of its positions, a scraper bowl carried by said frame, a lever for releasing the latching means for each said wheel, guide means at the forward corners of the frame and adjacent said movable means, and a cable connected to each said lever and extending through said guide means to a location accessible to the tractor operator for releasing said latching means.

5. A tractor drawn bowl type ground scraper or the like, comprising a transversely extending rectangular frame having front, rear and side bars, a triangular draft structure extending forwadly from the frame for attachment to a tractor, a wheel-carrying axle pivotally connected to the rear portion of each said side bar for swinging movement about a vertical axis from a position with the wheel in the rear of the frame to a position with the wheel alongside the frame, latching mechanism carried by the frame on each side of said pivot, latch means on the axle cooperable with either said latching mechanism to hold the wheel in either of its positions, a release lever for each said latching mechanism, a link connecting said levers for simultaneous operation, a scraper bowl carried by said frame, guide means on the frame and on said movable means, and a cable connected to one said release lever and extending through said guide means to a location accessible to the tractor operator for releasing said latch means.

JAMES L. HIPPLE.

REFERENCES CITED

The following references are of record in the file of this patent:

UNITED STATES PATENTS

| Number | Name | Date |
|---|---|---|
| 190,460 | Wilson | May 8, 1877 |
| 413,157 | Westervelt | Oct. 15, 1889 |
| 878,283 | Fink | Feb. 4, 1908 |
| 1,246,895 | Elliott | Nov. 20, 1917 |
| 1,822,051 | Lytle | Sept. 8, 1931 |
| 1,858,214 | Weeks | May 10, 1932 |
| 2,208,526 | Gurries | July 16, 1940 |
| 2,257,596 | Davenport | Sept. 30, 1941 |
| 2,351,830 | Mitchell et al. | June 20, 1944 |
| 2,441,744 | Barker | May 18, 1948 |
| 2,473,786 | Collins | June 21, 1949 |